Nov. 12, 1968
F. Z. FOUSE
3,410,417
ARTICLE TRANSFERRING MEANS
Filed Oct. 23, 1965
3 Sheets-Sheet 1
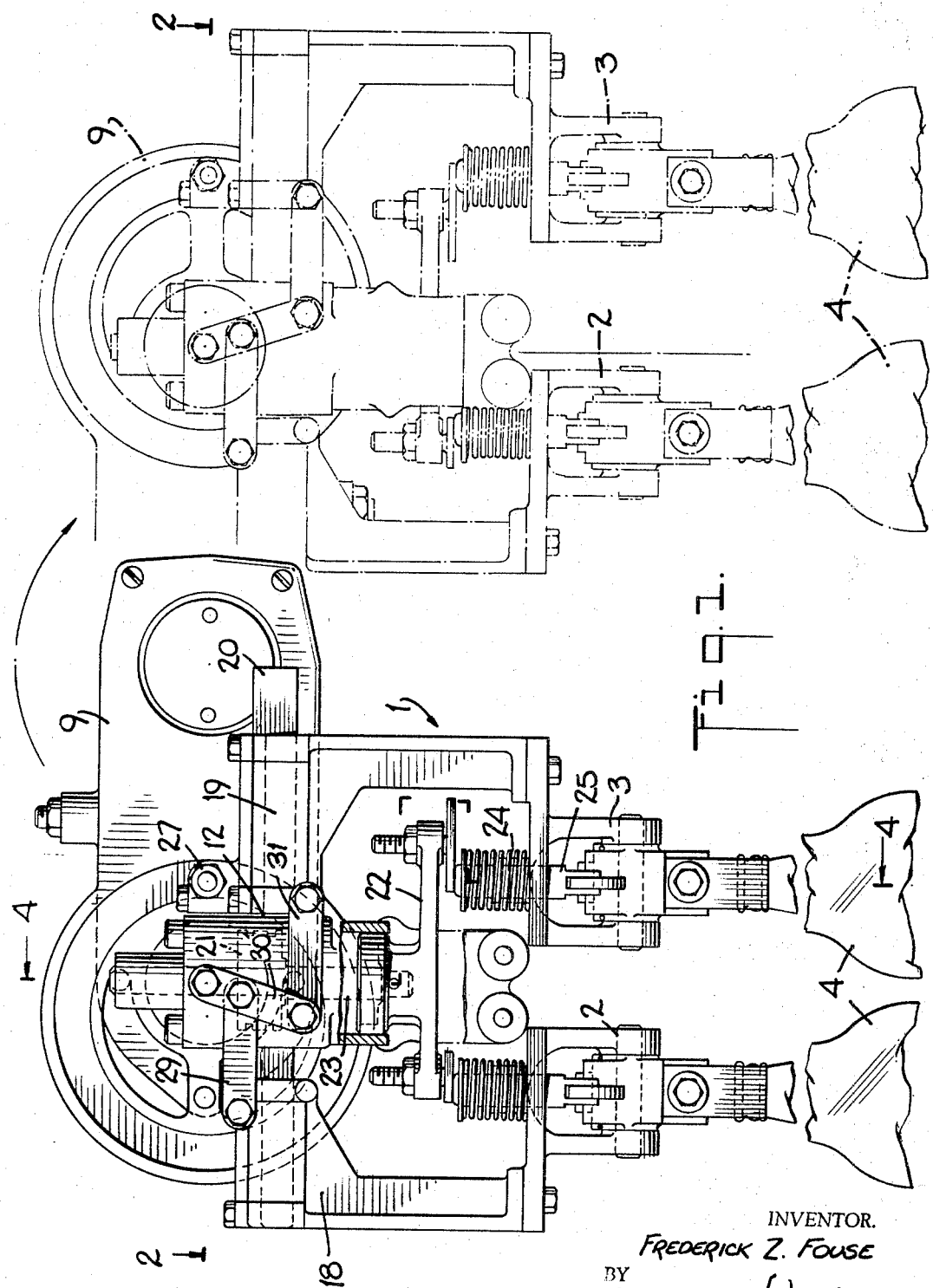
INVENTOR.
FREDERICK Z. FOUSE
BY
ATTORNEY

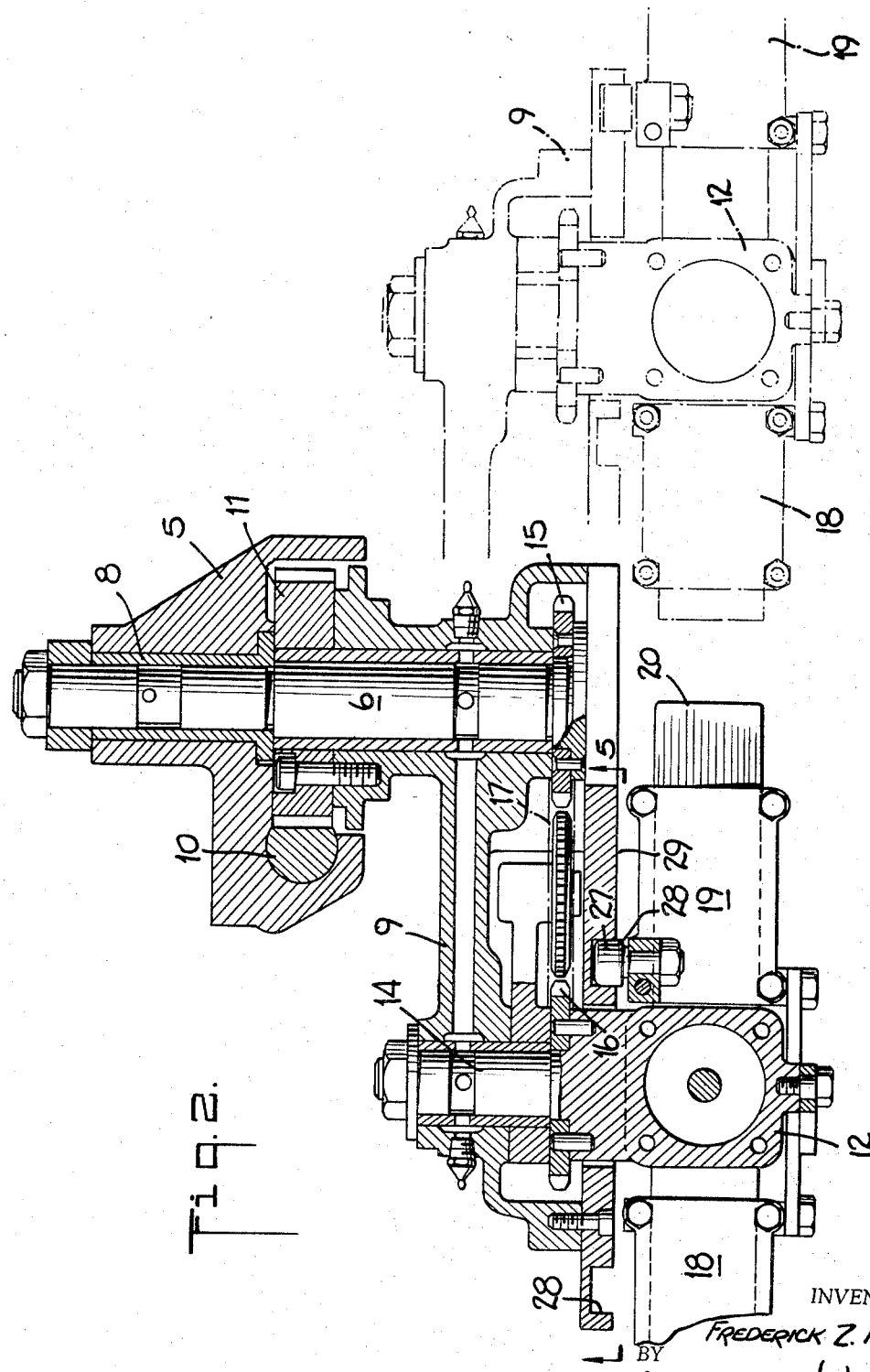

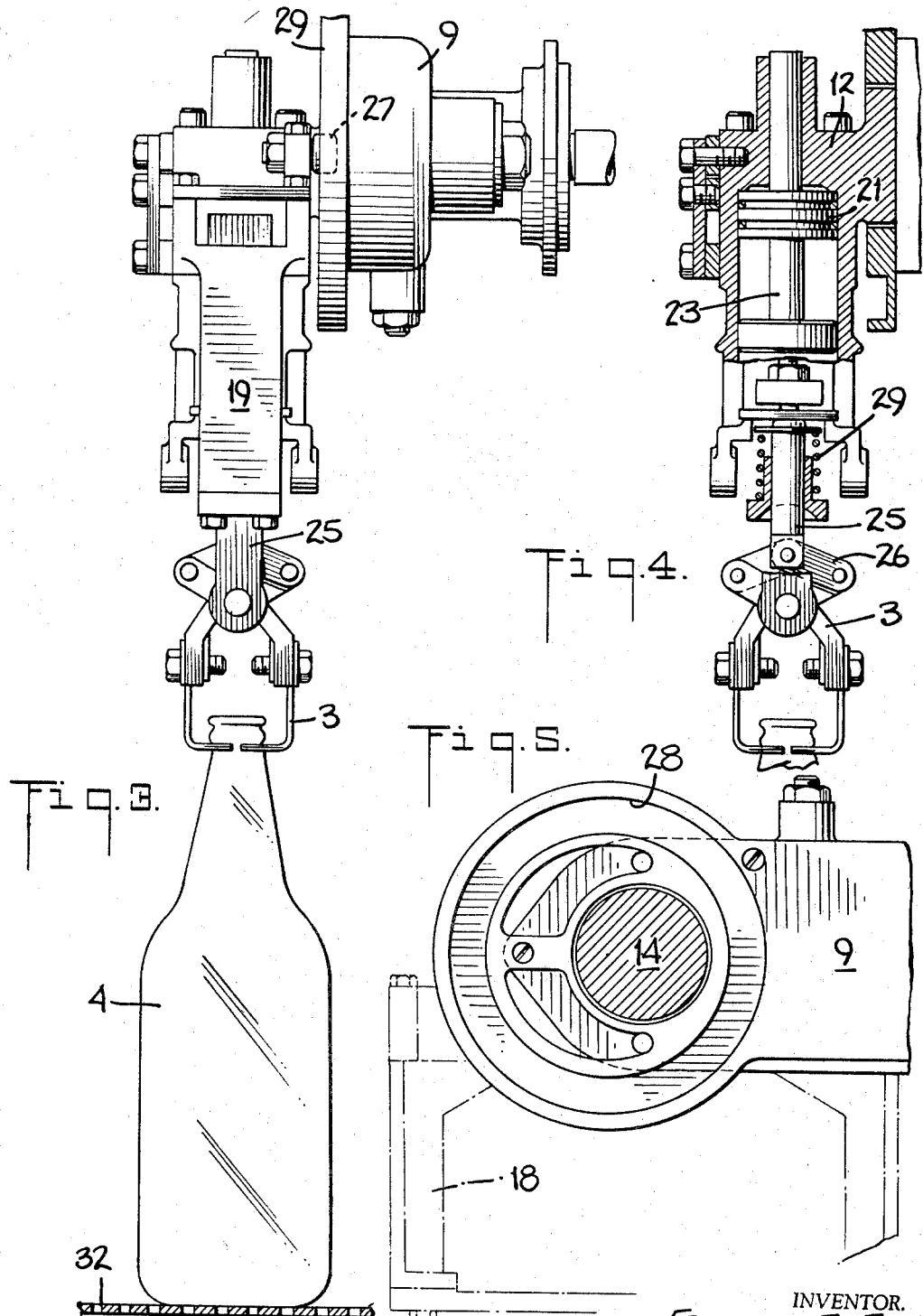

United States Patent Office 3,410,417
Patented Nov. 12, 1968

3,410,417
ARTICLE TRANSFERRING MEANS
Frederick Z. Fouse, Lancaster, Ohio, assignor to Anchor Hocking Glass Corporation, Lancaster, Ohio, a corporation of Delaware
Filed Oct. 23, 1965, Ser. No. 503,197
4 Claims. (Cl. 214—1)

ABSTRACT OF THE DISCLOSURE

A takeout mechanism for removing spaced glass articles from forming molds and for transferring them to a platform to be cooled while simultaneously changing the spacing between the articles. Separate article engaging jaws are each supported by a carriage mounted on a track on a pivoted transfer arm. The track attitude is maintained fixed during the rotation of the transfer arm and one of the article supporting carriages is moved along its mounting track as the transfer arm pivots by a cam operated linkage for adjusting the relative positions or spacing of the carriages in accordance with the transfer arm position.

---

The present invention relates to the manufacture of glassware and more particularly to an improved means for removing glass articles from forming molds after the forming operation has been completed.

Hollow glass articles are now manufactured on automatic forming machinery where gobs of molten glass are subjected to a series of shaping steps which may include pressing or blowing operations or a combination of both operations. A final forming operation, which is usually a blowing operation, completes the hollow articles so that they may be removed from the forming molds and transferred to a suitable conveyor or other handling means for additional treatment such as tempering or decorating. These automatic forming machines are now used with the molds at the various stages having two or more cavities charged simultaneously so that two or more separate glass articles are formed simultaneously in the molds.

One such well-known glass forming machine is known in the industry as an I.S. machine wherein the glass gob is formed by successive pressing and blowing operations.

The present invention comprises an improved means for removing the ware from the final molds at the last forming step such as the final blow mold on the I.S. machines wherein a removal device known as a takeout engages the tops of formed articles and transfers the warm molded ware to a dead plate or chilling plate where the articles are permitted to dwell temporarily so that they become sufficiently hard to resist deformation during their subsequent handling on conveyors or other transfer equipment.

In order to increase the output of the glassware forming machine such as the I.S. machines to set their production rate at an economic level, it has been found desirable to use dual cavity molds to form the articles in pairs even where relatively large items are being formed. Articles such as quart bottles, for example, are now formed in this manner. Where this is done, the increasing diameter of the articles has necessarily reduced the available spacing between mold cavity centers. This has presented a problem as the articles are removed from the open molds since the reduced spacing between the articles increase the chance of contact between the adjacent bottles as they are lifted from the molds causing defective ware through fusing or marking of the hot surfaces or due to contact injury or damage of the relatively warm soft glass articles. The improved takeout device of the present invention provides a novel means for engaging the spaced articles in the mold cavities and for smoothly increasing the separation between the articles and at the same time providing for the release of the articles at an adjustably and predetermined position on a dead plate or a cooling plate.

Accordingly, an object of the present invention is to provide an improved takeout means for glass-forming machines.

Another object of the present invention is to provide an improved takeout means for removing glassware from molds including article spacing and positioning means.

Other and further objects of the invention will be obvious upon an understanding of the illustrative embodiment about to be described or will be indicated in the appended claims, and various advantages not referred to herein will occur to one skilled in the art upon employment of the inventions in practice.

A preferred embodiment of the invention has been chosen for purposes of illustration and description and is shown in the accompanying drawings, forming a part of the specification wherein:

FIG. 1 is a side elevational view of the takeout means in accordance with the present invention and illustrating two positions, i.e., at the forming molds where the articles are engaged and at the dead plate where the articles are released;

FIG. 2 is a horizontal sectional view taken along line 2—2 on FIG. 1;

FIG. 3 is a front elevational view of the takeout means of FIG. 1;

FIG. 4 is a vertical sectional view taken along line 4—4 on FIG. 1; and

FIG. 5 is a vertical sectional view of the positioning cam taken along line 5—5 on FIG. 2.

In FIG. 1 the improved takeout device 1 is shown at the left in solid lines with its jaws 2 and 3 gripping a pair of bottles 4 whose formation has been completed in suitable molds, as for example, in the blow mold station of an I.S. machine. At the right-hand side of FIG. 1, the same pair of bottles 4 are shown after having been taken out of the I.S. machine by the takeout means 1 of the invention and placed on a dead plate or cooling plate or other support. The takeout means 1 releases two bottles 4 at this position and they usually are allowed to remain on the dead plate as they cool or are chilled for a sufficient time so that the glass temperature drops to a form-retaining state permitting further handling of the bottles to be done without damage to the bottles.

As illustrated in FIGS 1 and 2, the takeout device 1 is mounted on a stationary vertical post 5 attached on or adjacent to the blow mold station to the I.S. machine. A horizontal shaft 6 is rotatably mounted on the post 5 on suitable bearings 8 and a transfer member or takeout arm 9 is attached to the end of the shaft 6 for rotary movement therewith. During the takeout operation, the takeout arm 9 rotates between the two positions illustrated at FIG. 1 so that it turns about 180°. This turning movement is provided by a suitably synchronized drive for the shaft 6 such as the vertical rack 10 and the pinion 11 as illustrated in FIG. 2.

The formed glassware articles such as the bottles 4 are each gripped by the jaws 2 and 3 which are supported on a head 12 pivotally mounted on a support shaft 14 on the takeout arm 9. A pair of sprockets 15 and 16 are connected by a chain 17 to provide a leveling means which holds the takeout head 12 in its horizontal position continually as the take-out arm 9 is swung from the pickup position to the release position.

In order to facilitate the article spacing and the article positioning as will be more fully described below, the jaws 2 and 3 are mounted on individual carriages 18 and 19 respectively which are slidably supported by outwardly extending tracks 20 on the takeout head 12. The center portion of the head 12 includes a drive piston 21 which is air or hydraulically operated to lower a cross arm 22 attached to the bottom of a piston rod 23.

The cross arm 22 is urged towards its upper position as illustrated by the spring 24 which raises plungers 25 to close the jaws 2 and 3 through the pivoted jaw link members 26. The jaws 2 and 3 are opened by the admission of air or hydraulic fluid above the piston 21 to lower the piston rod 23 and the cross arm 22 thereby depressing the two plungers 25 against the force of the springs 24 to swing the jaw members 2 and 3 open to thereby release the bottles 4. A suitable control valve not illustrated may be employed to raise and lower the piston 21 at the appropriate time and this valve may be controlled by the regular cam system provided on the glassware forming machine to synchronize the operation of the takeout device with that of the other forming machine mechanisms including the mold opening and closing controls.

The above described rack 10 and pinion 11 for rotating the takeout arm to and from its loading position may be similarly controlled by a suitable cam or coupling synchronized by the glassware forming machine control cam shaft.

The spacing between the center lines of the jaws 2 and 3 and the bottles 4 supported thereon is controlled by the position of the two clamp carriages 18 and 19 on their horizontal supporting tracks 20. The carriage 19 has a cam follower roller 27 rotatably mounted on arm 9 as best illustrated in FIG. 2 and which is fitted into a circular cam track or slot 28 in the face 29 of the takeout arm 9. It will be seen that the clockwise rotation of the takeout arm 9 as illustrated in FIG. 1, which carries the bottles 4 from the mold to the dead plate causes a relative rotation between the cam slot 28 and the cam roller 27 as the cam roller moves around a 180° arc on the cam slot 28. The cam slot 28 is shaped to position the right-hand clamp 3 on the bottle neck at the mold station as illustrated for the left-hand position of the takeout arm 9 and to move the carriage on its supporting track 20 as the takeout arm 9 carries the bottle 4 to its release position. Increased spacing between bottles 4 is conveniently obtained by a circular cam slot 28 whose center is offset towards carriage 18 from the axis of the head supporting shaft 14. The diameter of the cam slot 28 is chosen to provide the desired spacing increase.

The left-hand carriage 18 supporting the article clamp 2 has its position adjustably controlled by a toggle or link system connecting two carriages 18 and 19 and including the pivotally attached links 29, 30, and 31. The preferred linkage system includes the central link 30 pivotally attached at one end to the takeout head 12 and pivotally connected at its lower end to the lower link 31 which has its opposite end pivotally connected to the right-hand carriage 19. The left-hand carriage 18 is connected to the center link 30 by link 29 pivotally attached to the left-hand carriage at one end and to the center link 30 at its opposite end.

It is clear that this linkage arrangement may be setup or adjusted to provide for the particular movement desired for the clamp 2 and based upon the already described movement of the clamp 3 during the transfer movement. With the particular linkage illustrated, for example, it is seen that the left-hand bottle 4 is also moved to the right a fraction of the distance through which the cam roller 27 moves the right-hand bottle 4. This linkage thus provides for an increased spacing and at the same time shifts the left-hand bottle 4 a small amount in the same direction as the right-hand bottle to place it at a predetermined position on the dead plate 32.

The shape of the cam slot 28 thus may be set to determine the position of the right-hand bottle 4 on the dead plate 32 and the linkage may be adjusted to apply any portion of this shifting movement to the left-hand bottle 4. The closer that the link 29 is attached to the top of the center link 30, the greater will be the increase in spacing between the two bottles. Correspondingly, the closer the link 29 is connected to the bottom of the center link, the smaller will be the spacing increase and the greater will be the shift of the left-hand bottle 4 away from the forming machine on the dead plate 32.

It will be seen that an improved article takeout mechanism has been provided which combines a novel and smoothly effectuated article transfer with a spacing control and with an adjustment of the final position of the articles being handled. This improved spacing control is readily applicable to the takeout equipment presently in use with glass forming machines and may be incorporated by relatively simple modifications to the existing takeout apparatus.

The improved takeout of the invention also is relatively easily adjusted and is incorporated in the takeout equipment in a readily accessible form in which the control members are accessible for adjustment, maintenance, and observation during the initial adjustment and subsequent operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A takeout device for engaging and removing a pair of glass articles from a forming machine having a dual cavity mold comprising the combination of a movably mounted takeout member, means to move said takeout member, a pair of article engaging members, carriage means for supporting each of said article engaging members, track means on said takeout member supporting said carriage means for movement thereon, means to maintain said track means in a constant attitude during movement of said takeout member, a cam race on said take-out member, a cam follower on one of said carriage means riding in said race for controlling the position of that article engaging member on said track, and link means coupling said takeout member and other article engaging member to said one article engaging member for simultaneously adjusting the spacing between articles supported by said article engaging members.

2. The takeout device as claimed in claim 1 in which said article engaging members comprise jaws, and in which a motor is mounted on said takeout member and is operatively coupled to said jaws for opening and closing them.

3. A takeout device for engaging and removing glass articles from a forming machine having a multicavity mold comprising the combination of a pivotally mounted transfer arm, track means mounted on said transfer arm, a plurality of article engaging members, carriage means for supporting each of said article engaging members for movement on said track means, means to maintain said track means in a constant attitude during pivoting of said transfer arm, cam means mounted on and moving with said transfer arm, follower means on one of said article engaging members riding in said cam means for controlling the position of that member relative to said transfer arm, linkage means coupling the other article engaging members to said one member for simultaneously adjusting the spacing between articles supplied to said article engaging members.

4. The takeout device as claimed in claim 3 in which said article engaging members comprise jaws, and in which a motor is mounted on said transfer arm and is operatively coupled to said jaws for opening and closing them.

References Cited

UNITED STATES PATENTS

| 3,095,082 | 6/1963 | Allgeyer | 214—1 X |
| 3,168,204 | 2/1965 | Voullaire | 214—6 |
| 3,220,566 | 11/1965 | Rowe | 214—1 |
| 3,272,360 | 9/1966 | Van Der Schoot | 41—1 X |

GERALD M. FORLENZA, *Primary Examiner.*

F. E. WERNER, *Assistant Examiner.*